Inventor:
IRVING W. EDWARDS,
by John E. Jackson
his Attorney

Patented June 4, 1940

2,202,844

UNITED STATES PATENT OFFICE 2,202,844

STRAND OR CABLE

Irving W. Edwards, Detroit, Mich.

Application March 26, 1938, Serial No. 198,314

2 Claims. (Cl. 57—139)

This invention is particularly concerned with composite electric cables of the type which, in the interests of economy, are made from a relatively few wires intertwisted into a strand.

Usually, three wires are intertwisted, one of these wires being made of steel or metal of similar strength and the other two of copper or some other metal possessing good electrical conductivity. Such a cable is not only unbalanced but is also subject to sagging because the harder wire tends to straighten and the softer wires will conform to the harder wire into a wider helix as though wrapping around a mandrel. My object is to construct a cable that is not substantially more expensive than this three-wire type, yet which eliminates the undesirable action just mentioned.

Accordingly, my invention contemplates a strand of relatively softer and harder intertwisted wires, the latter diametrically intercontacting and being symmetrical about the strand axis, and the softer wires being laid in the interstices between the harder wires. The intercontacting surfaces of the harder wires may be shaped to provide relatively large bearings, or the intercontacting surfaces of all the wires may be shaped with the same end in view.

A composite electric transmission cable constructed according to the above principles will possess the advantage that the two harder wires bear against one another instead of against the other wires included because of their electrical conductivity advantages and, therefore, necessarily made of softer metal. It follows that the wires primarily included for strength cannot straighten under tension, whereby deformation and "creep" of the cable is retarded.

Figure 1:
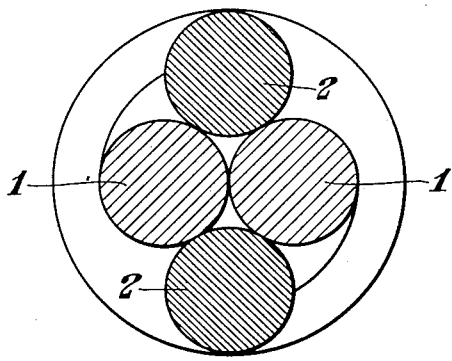
Figure 2:
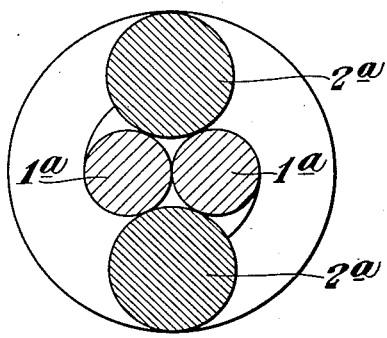
Figure 3:
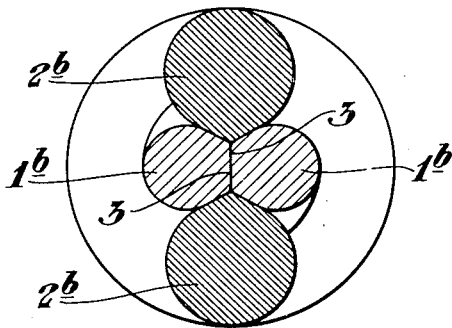

Specific examples of the foregoing are illustrated by the accompanying drawing which illustrates cross-sections of four specific examples of possible arrangements, Figure 1 being the first example;
Figure 2 the second example;
Figure 3 the third example; and,
Figure 4 the fourth example.

More specifically, in Figure 1 four wires, all of equal diameter, are intertwisted to produce a cable, the wires 1 being made of steel and arranged to diametrically intercontact and the other two wires, numeraled 2, being made of copper and carried in the interstices between the two first mentioned wires. Metals other than copper may be used provided they are good electrical conductors, it being equally obvious that the wires 1 may be made of metals other than steel, provided they possess sufficient elasticity and tensile strength.

When tension is placed on such a cable, the wires 1 bear against each other, as contrasted to bearing against the softer wires 2, and since both wires 1 are of equal hardness, strength and toughness, no permanent deformation of the cable as a whole results. Since deformation is prevented, sagging of the cable in service, such as might otherwise result from ice and wind loads, is not excessive at any time.

In the case of Figure 2, the same construction is provided except that the wires made of steel or other hard metal 1a, are smaller than the wires 2a made of copper or other metal of good electrical conductivity, which are relatively softer.

In Figure 3 the wires 1b of harder metal are shaped to provide relatively broad intercontacting surfaces 3. Furthermore, the wires 2b of softer metal are slightly shaped to more perfectly fit the interstices between the wires 1b. All this is to the end of providing a bearing surface of greater area and, therefore, greater resistance to deformation during cable tensioning. In addition, Figure 3 shows greater surface areas of contact of the wires which will lessen the tendency of removal of the galvanized coating due to abrasion which will be more pronounced in the case of single point contacts as provided by the construction of Figures 1 and 2.

Figure 4:
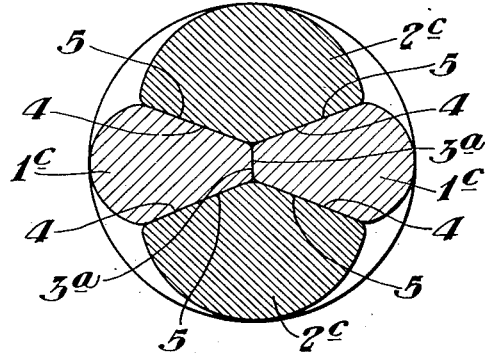

Figure 4 carries the idea shown by Figure 3 even further, the harder wires 1c being considerably tapered, as at 4, and the softer wires 2c being provided with surfaces 5 fitting the surfaces 6. Since the wires 1c possess considerable hardness their inner bearing surfaces 3a may be safely reduced in size. In this particular construction, the harder wires bear against one another during cable tensioning, while the softer wires 2c bear against the harder wires by way of very large surfaces.

Figure 3, due to its generally twisted and more or less flattened sectional form, is conducive to vibration under wind forces in a more or less axial direction but is less conducive to vibration under lateral wind forces in breaking up the vibrational nodes. This section is also, in general, proportioned mechanically and electrically in the relative sectional areas to meet the most generally accepted conditions. On the other hand, Figure 4, having a generally circular sectional area in its combined form, is less conducive to vibrations set up by axial wind forces but will be more effected by the lateral wind forces under certain weather conditions, that is, sleet and ice collecting on the wire form a vane of ice and when the wind strikes this vane of ice there will be a whipping of the conductor. In this general construction the proportioning of copper and steel may be varied at will to meet specific mechanical and electrical limitations.

A further feature of the invention consists in making of processing the various wires so that they all have physical characteristics providing the same percentages of elongation regardless of their differences respecting elastic limits and tensile strengths. An exemplary way of accomplishing this is by giving a lesser number of cold drawing drafts to the hard drawn copper wire used, whereby to bring its elongation to about the same as steel wire cold drawn to provide it with a permanent elongation under tensile stress of about 4½ per cent. The ordinary hard drawn copper wire commercially available has an elongation of only about 1½ per cent.

I claim:

1. A strand of intertwisted relatively softer and harder wires, the latter diametrically intercontacting and being symmetrical about the strand axis, and the softer wires being laid in the interstices between the harder wires, the intercontacting surfaces of the harder wires being shaped to provide larger bearings than would be provided by cylindrical wires.

2. A strand of intertwisted relatively softer and harder wires, the latter diametrically intercontacting and being symmetrical about the strand axis, and the softer wires being laid in the interstices between the harder wires, the intercontacting surfaces of all the wires being shaped to provide larger bearings than would be provided by cylindrical wires.

IRVING W. EDWARDS.